(12) United States Patent
Chatras et al.

(10) Patent No.: US 10,958,541 B2
(45) Date of Patent: Mar. 23, 2021

(54) SELECTION OF A NETWORK SLICE IN RELATION TO AN APPLICATION

(71) Applicant: Orange, Paris (FR)

(72) Inventors: Bruno Chatras, Chatillon (FR); Steve Tsang Kwong U, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/617,976

(22) PCT Filed: May 25, 2018

(86) PCT No.: PCT/FR2018/000142
§ 371 (c)(1),
(2) Date: Nov. 27, 2019

(87) PCT Pub. No.: WO2018/220291
PCT Pub. Date: Dec. 6, 2018

(65) Prior Publication Data
US 2020/0112492 A1     Apr. 9, 2020

(30) Foreign Application Priority Data

Jun. 1, 2017 (FR) ........................................ 1754875

(51) Int. Cl.
| | | |
|---|---|---|
| *G06F 15/173* | (2006.01) | |
| *H04L 12/24* | (2006.01) | |
| *H04L 29/08* | (2006.01) | |
| *H04W 48/14* | (2009.01) | |
| *H04W 48/18* | (2009.01) | |

(52) U.S. Cl.
CPC .......... *H04L 41/5096* (2013.01); *H04L 67/32* (2013.01); *H04W 48/14* (2013.01); *H04W 48/18* (2013.01)

(58) Field of Classification Search
CPC .... H04L 41/5096; H04L 67/32; H04W 48/14; H04W 48/18
See application file for complete search history.

(56) References Cited

U.S. PATENT DOCUMENTS 10,667,181 B2 * 5/2020 Salkintzis ............. H04W 76/12
2017/0366399 A1 * 12/2017 Li ........................ H04L 41/0816
(Continued)

FOREIGN PATENT DOCUMENTS

WO     2017063708 A1     4/2017

OTHER PUBLICATIONS

International Search Report dated Oct. 9, 2018 for corresponding International Application No. PCT/FR2018/000142, filed May 25, 2018.
(Continued)

*Primary Examiner* — Jonathan A Bui
(74) *Attorney, Agent, or Firm* — David D. Brush; Westman, Champlin & Koehler, P.A.

(57) ABSTRACT

A method for selecting a set of functions of a communications infrastructure, referred to as a network slice, for routing data relating to an application installed in a user terminal connected to the infrastructure. The method is implemented by the terminal and includes: transmitting, to a rule management entity, an identifier of at least one application in the terminal; receiving, from the rule management entity, at least one rule relating to the network slice associated with the identifier of the at least one application received; and determining a network slice based on the at least one rule obtained.

14 Claims, 6 Drawing Sheets

(56) References Cited

U.S. PATENT DOCUMENTS

| | | | | |
|---|---|---|---|---|
| 2018/0176858 A1* | 6/2018 | Wang | .................... | H04W 76/12 |
| 2018/0192390 A1* | 7/2018 | Li | ........................... | H04W 4/50 |
| 2018/0270840 A1* | 9/2018 | Griot | .................... | H04L 5/0055 |
| 2019/0261159 A1* | 8/2019 | Wang | .................... | H04W 48/16 |
| 2019/0364541 A1* | 11/2019 | Ryu | ..................... | H04W 72/02 |
| 2020/0178048 A1* | 6/2020 | Kim | ..................... | H04W 8/005 |
| 2020/0344774 A1* | 10/2020 | Starsinic | ............... | H04W 12/06 |

OTHER PUBLICATIONS

English translation of the International Written Opinion, dated Oct. 16, 2018 for corresponding International Application No. PCT/FR2018/000142, filed May 25, 2018.

"3rd Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Mobile Competence Centre; 650, Route Des Lucioles; F-06921 Sophia-Antipolis Cedex; France, vol. SA WG2, No. V01.4.0, Apr. 20, 2017 (Apr. 20, 2017), pp. 1-123, XP051298170.

"3rd Generation Partnership Project; Technical Specification Group Services and System Aspects; Study on Architecture for Next Generation System (Release 14)", 3GPP Standard; 3GPP TR 23.799, 3rd Generation Partnership Project (3GPP), Mobile Competence Centre; 650, Route des Lucioles; F-06921 Sophia-Antipolis Cedex; France, vol. SA WG2, No. V14.0.0, Dec. 16, 2016 (Dec. 16, 2016), pp. 1-522, XP051230010.

* cited by examiner

SELECTION OF A NETWORK SLICE IN RELATION TO AN APPLICATION

CROSS-REFERENCE TO RELATED APPLICATIONS

This application is a Section 371 National Stage Application of International Application No. PCT/FR2018/000142, filed May 25, 2018, which is incorporated by reference in its entirety and published as WO 2018/220291 A1 on Dec. 6, 2018, not in English.

1. Field of the Invention

The patent application lies in the field of telecommunications infrastructures and of techniques relating to network slices.

2. Prior Art

The architecture of mobile telecommunications networks is standardized via a standardization group known by the name 3GPP. Such is in particular the case for the so-called "2G", "3G" and "4G" mobile networks, whose various architectures are defined in technical specifications established by this organization.

Up till the "4G" generation of mobile network currently undergoing deployment in a majority of countries, the various network architectures usually rely on very specific equipment dedicated to certain precise functionalities, be it at access network or core network level, in particular as regards the transmission of packets from or to a mobile terminal. In the network infrastructures deployed up till now, a single set of functions is used irrespective of the type of traffic. The various streams of the sessions are thus circulated by one and the same set of functions (routing, addressing, control of the data streams, naming, etc.).

The lack of flexibility and of upgradability inherent in this type of conventional architecture has made it necessary to envisage the adoption of more flexible architectures for the next generation of mobile networks, termed "5G", so as to be able to respond rapidly to extremely diverse demands in terms of traffic or of quality of service. It should be noted that 5G networks are intended to relate both to mobile networks and to fixed networks. Consequently, the techniques inherent in the development of 5G networks relate both to fixed and mobile infrastructures.

Among the solutions envisaged, one of the most promising solutions relies on a network slicing technique, mentioned in particular in the 3GPP technical report TR 23.799 v2.0.0 of December 2016.

Figure 1:
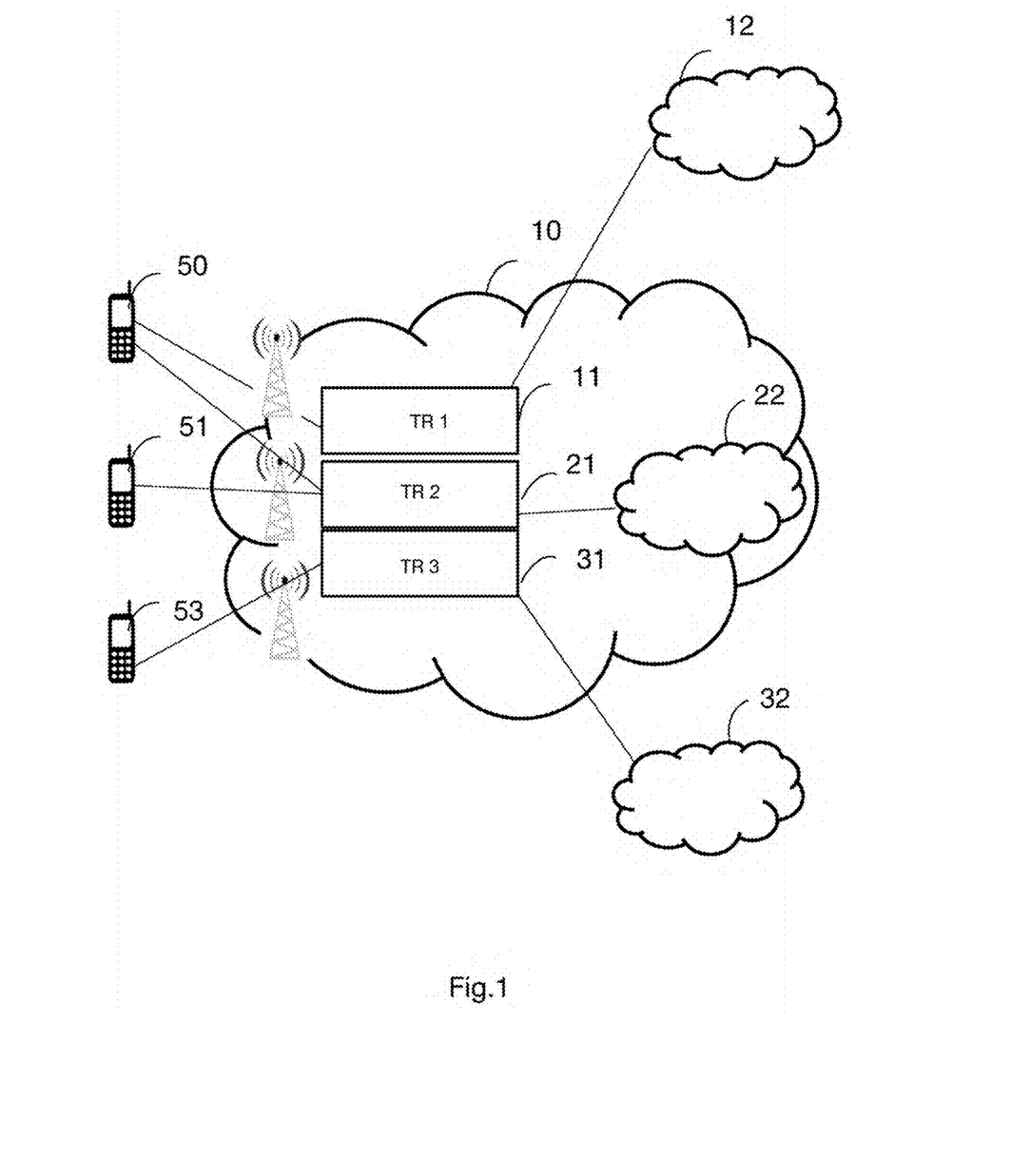
FIG. 1 presents a simplified view of a layout of a communications infrastructure according to the prior art.

The concept of network slice is intended to create several network instances, also called "network slices" in English. FIG. 1 presents a simplified view of a layout of a communications infrastructure 10, according to the prior art, comprising network slices TR1, TR2, TR3 each representing a mobile network which share functions (routing, addressing, control of the data streams, naming, etc.) implemented for example in data centers. The terminal 50 is connected to two network slices TR1 and TR2 while the terminal 51 is attached to the slice TR2 and the terminal 53 to the slice TR3. The slice TR1 affords access to the data network 12, the network slice TR2 affords access to the network 22 and the network slice TR3 affords access to the network 32. In this example, the network slices afford access to distinct data networks but the network slices can also afford access to the same communication network. The network slices, which can be likened to distinct mobile networks, are determined by the characteristics of the data streams traveling on these slices which exhibit common points in terms of destination, of conveying, of security constraints justifying common management within a network slice.

Each of the slices is thus optimized for the needs of a particular type of service and/or of a type of client or of terminal.

A terminal, in particular a mobile terminal, supports an ever more significant number of applications, proposed by various parties among which are the network operator to which the terminal connects, and applications providers. The traffic generated by these diverse applications must be carried on the various network slices implemented in the communications infrastructure to which the terminal is connected. A network slice is composed of network functions and of configurations making it possible to satisfy the demands linked with the services, clients or terminals relating to the slice. The network slices deployed by an operator are not all configured with the same conveying characteristics, given that the idea is to adapt the architecture and the network slices to the needs of the case of usage linked with this network slice. By way of example, a network slice implemented for services linked with IoT (in English Internet of Things) services may make it necessary to manage a large number of terminals but a bitrate associated with each terminal that is rather low, if dealing for example with meter readings. A service offered to professional customers will require advanced security and availability functions. The objective is to activate for a given network slice only the functions that are indispensable for the case of usage corresponding to the network slice. The objective of this network slice architecture is to provide the operator with more flexibility and to offer clients services corresponding to their needs by activating the functions necessary for the service requested.

Such a network slicing technique thus allows the operator of a telecommunications network to create "made to measure" networks capable of providing optimized solutions for very varied scenarios with very diverse constraints in terms of functionality and performance.

Provision is made for a multitude of network slices to be able to be executed simultaneously within one and the same telecommunications network, so as to offer various services to various customers on one and the same network.

When a terminal connects to the telecommunications network, one or more network slices corresponding to the terminal or to the service activated on the terminal must be selected. As indicated hereinabove, a terminal has at its disposal a large number of applications, each being able to request parameters for conveying the data linked with these specific services and, consequently, network slices suited to their needs must be selected.

The 3GPP specification TR 23.799 (version 2.0.0 of December 2016) indicates that the network will be able to provide the terminal with rules allowing it to select a network slice as a function of the services that it wishes to use. This specification does not specify when or how these rules are generated and used by a terminal to actually contrive matters so that the data of an application are conveyed on an appropriate network slice.

The object of the present invention is to remedy these drawbacks.

3. Disclosure of the Invention

The invention seeks to improve the situation with the aid of a method for selecting a, so-called network slice, set of functions of a communications infrastructure, for the conveying of data relating to at least one application installed on a user terminal attached to said infrastructure, implemented by the terminal and comprising:
a step of sending, to a rules management entity, a request message comprising at least one application identifier,
a step of receiving, from the rules management entity, a response message comprising at least one rule relating to the network slice associated with the at least one identifier,
a step of selecting the network slice as a function of the at least one rule obtained.

A network slice can advantageously be implemented to transport the data of one or more applications, these applications sharing needs which are equivalent in terms of quality of service (latency, bitrate, priority). A network composed of multiple network slices can thus convey a diversity of data streams having different characteristics while affording each type of data a configuration and conveying parameters that are suited to the needs of the various data streams linked with the applications used.

The selection method advantageously makes it possible to be able to select the network slice meeting the needs of the application whose data are circulated on the selected slice. The terminal, on which the application is run, transmits the identifier of the application for which a network slice must be selected, to a rules management entity in charge of associating a rule with the application. When a new application is installed on the terminal, the latter determines the identifier of this application and transmits said identifier to the management entity so as to receive a rule allowing it to associate a network slice with this identifier. On receipt of the rule, the terminal is able to determine the network slice, for example by maintaining a table associating the rule with the network slice to be chosen. This selection method makes it possible to obtain just the rules which are useful to it, that is to say corresponding to applications installed on the terminal. According to an alternative, in particular if the management entity knows that the terminal can support a significant number of rules, the rules management entity returns a set of rules to the terminal, not being limited solely to the rule corresponding to the identifier received. The rule transmitted may for example correspond to the parameter S-NSSAI (in English Single Network Slice Selection Assistance Information), used by the terminal to determine the network slice corresponding to the application.

According to the prior art, the need to structure a communication network as network slices has indeed been identified. However, this prior art does not propose any means of associating a network slice with application-related characteristics so that the data streams of a terminal are conveyed as a function of their characteristics, by selecting a network slice suited to these characteristics.

According to one aspect of the invention, in the selection method, the request message comprises the identifiers of the applications installed on the terminal at the moment of attachment of the terminal to said infrastructure.

A terminal attaching to the network may already have several applications installed. In this case, the terminal must obtain the set of rules corresponding to these various applications. It is therefore necessary for the terminal, when it attaches to the network, to obtain these various rules. This allows the terminal to hold all the rules as soon as it attaches and thereafter faster use of the applications since the terminal does not have to invoke the rules management entity when an application has to be used. The protocol used to transmit the request message may be a protocol for attachment to the infrastructure or else an attachment-independent protocol such as an API REST (in English Applications Programming Interface—Representational State Transfer) dedicated to the need to transmit the identifiers to a rules server.

According to another aspect of the invention, in the selection method, the request message is a message relating to the attachment of the terminal.

The recovery of the rules during the attachment of the terminal can furthermore be implemented by using the communications protocols used during attachment.

For example, when the terminal connects to a mobile telecommunications network, the terminal can recover the rules, for example in the data present in the PCO (in English Protocol Configuration Option) during the establishment of the PDN (in English Packet Data Network) connection and if the network is a fixed one, the terminal can obtain the rules in a DHCP (in English Dynamic Host Configuration Protocol) or PPP (in English Point-to-Point Protocol) message of connection to the fixed network.

According to another aspect of the invention, in the selection method, the at least one application identifier furthermore comprises an item of information relating to an application version.

According to the deployment options for the network architectures and network slices, an item of information on the version of the application may be necessary for the association of a rule. A version of an application may for example be associated with a network slice while a more recent version, which integrates for example more conveying performance parameters or security parameters, can be associated with a network slice in accordance with the advanced parameters of the better-performing version.

According to another aspect of the invention, the at least one application identifier is determined by the terminal.

It is possible for an application to have at its disposal a unique identifier allowing the rules management entity to be able, on the basis of this identifier, to unambiguously distinguish the application, or indeed the version of the application. Such is in particular the case if the application is loaded from a server of applications that are accessible from a terminal attached to any type of communications infrastructure. In certain cases, the identifier of the application is not sufficiently explicit to be utilized by the management entity and the terminal can determine a unique identifier for an application. According to case, it may for example add a suffix or a prefix to an identifier that might not be sufficiently explicit. The suffix or the prefix may for example identify the applications server invoked to load the application, or else the operating system of the terminal or indeed an identifier of the terminal or a combination of such information. The identifier determined must be able to be explicit through the management entity so that the latter can select a rule on the basis of this identifier. The prefix or the suffix possibly added must be interpreted by the management entity.

The various aspects of the selection method which have just been described can be implemented independently of one another or in combination with one another.

The invention also relates to a method for associating at least one rule relating to a, so-called network slice, set of functions of a communications infrastructure, with an identifier of an application of a terminal attached to said infrastructure, implemented in a rules management entity, characterized in that it comprises:
a step of receiving from the terminal a request message comprising at least one application identifier, a step of determining at least one rule relating to the network slice associated with the at least one identifier, a step of sending to the terminal a response message comprising the at least one rule determined.

The association method is implemented by the rules management entity in its client-server type relation with the terminal requesting a rule for an application. In order to determine a rule to be associated with an identifier of an application, for which it is invoked by a terminal, the rules management entity can comprise a database internal to the entity or else external to the latter, in which the rules corresponding to the application identifiers are retained. During the attachment of a terminal to the communications infrastructure, this association method can advantageously make it possible to identify all the network slices corresponding to the diverse applications, or indeed to the diverse versions of applications, present on the terminal.

According to one aspect of the invention, in the association method, a priority parameter is associated with the at least one rule and transmitted to the terminal.

The data associated with an application can be transmitted on several network slices. For example, depending on whether the terminal is in a situation of being attached to a visited network (in English "roaming") or to its "mother" network, the data of the application can be transmitted on different network slices. The data of an application can, according to another option, be carried on distinct slices as a function in particular of the availability or of criteria of quality of service of the network slice at a given moment. It may be useful for the management entity to transmit a priority indicator in addition to the rules. Thus, the terminal can determine which rule to take by priority and, if the latter is not available, which other rule it should consider. In the case of roaming, the network slice having the greatest priority, corresponding to a network slice of the mother network, may not be selected and the terminal then opts for the second or one of the network slices having a lower priority, according to the terminal's selection algorithm.

According to another aspect of the invention, in the association method, the rule associated with the at least one identifier relates to a service class.

A network slice can advantageously be implemented for applications requiring one and the same processing by an operator, to comply with quality-of-service criteria in particular. Thus, applications of real-time type can be associated with one network slice whilst applications having fewer constraints can be associated with another slice. A service class can thus be determined on the basis of an application identifier and the terminal will utilize the information on the service class received to select a suitable network slice, by invoking a server or on the basis of an internal database.

According to another aspect of the invention, in the association method, a default rule is determined and transmitted to the terminal in the case where the at least one application identifier is not associated with any rule.

A large number of applications, or indeed of versions of applications, are loaded on the terminals of the clients of an operator and it is difficult for the latter to associate an explicit rule with each application or each application version. It is indeed necessary to very regularly update the management entity with the new applications and analyze these applications to match to them up with a corresponding rule in such a way that the data of these applications are conveyed in accordance with the parameters of these applications and policies of the operator of the communications network slices. It is therefore advantageous to define explicit rules for the most widespread applications or versions of applications and to associate a default rule with the applications that are the least commonplace or the least strategic for the operator in charge of associating a rule. Thus, a limited number of rules will be used to manage the diversity of applications and the data of the applications that are the least significant for the operator will be conveyed on a network slice associated with a default rule.

According to another aspect of the invention, in the association method, the rules management entity is implemented in an applications server.

The rules management entity can advantageously be implemented in an applications server. Indeed, when a terminal downloads a new application, it can also recover the rules corresponding to the downloaded application. Thus, the obtaining of the rules is optimized since there is no need to invoke another server when an application is downloaded and, furthermore, it appears beneficial to transmit in addition to the application the rule or rules allowing its use on a communications infrastructure. Given that the architectures of communications networks are operator-specific, it may be necessary to identify the network of the operator or the operator in order to provide the rules corresponding to the network or to the operator ensuring the connection of the terminal, in particular an applications server is involved which is not specific to an operator.

The various aspects of the association method which have just been described can be implemented independently of one another or in combination with one another.

The invention also relates to a device for selecting a, so-called network slice, set of functions of a communications infrastructure, for the conveying of data relating to at least one application of a user terminal attached to said infrastructure, comprising:

a sender able to send, to a rules management entity, a request message comprising at least one application identifier, a receiver, able to receive, from the rules management entity, a response message comprising at least one rule relating to the network slice associated with the at least one identifier, a selection module, able to select a network slice as a function of the at least one rule obtained.

This device, able to implement in all its embodiments the selection method which has just been described, is intended to be implemented in a terminal.

The invention also relates to a device for associating a rule relating to a, so-called network slice, set of functions of a communications infrastructure, with an identifier of an application of a terminal attached to said infrastructure, implemented in a rules management entity, comprising:

a receiver, able to receive from a terminal a request message comprising at least one application identifier, a determination module, able to determine at least one rule relating to the network slice associated with the at least one identifier, a sender, able to send to the terminal a response message comprising the at least one rule determined.

This device, able to implement in all its embodiments the association method which has just been described, is intended to be implemented in a rules management entity.

The invention also relates to a system for selecting a network slice including a terminal comprising a selection device and a rules management entity comprising an association device.

The invention also relates to a computer program comprising instructions for the implementation of the steps of the selection method which has just been described, when this program is executed by a processor.

The invention also relates to a computer program comprising instructions for the implementation of the steps of the association method which has just been described, when this program is executed by a processor.

These programs can use any programming language, and be in the form of source code, object code, or of code intermediate between source code and object code, such as in a partially compiled form, or in any other desirable form.

The invention also provides for an information medium readable by a computer, and comprising instructions of the above-mentioned computer programs.

The information medium can be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded over a network of Internet type.

Alternatively, the information medium can be an integrated circuit in which the program is incorporated, the circuit being adapted to execute or to be used in the execution of the method in question.

4. Presentation of the Figures

Other advantages and characteristics of the invention will become more clearly apparent on reading the following description of a particular embodiment of the invention, given by way of simple illustrative and nonlimiting example, and of the appended drawings, among which.

5. Detailed Description of at Least One Embodiment of the Invention

In the subsequent description, examples are presented of several embodiments of the invention in a mobile communications infrastructure but the invention can also be implemented in a fixed network infrastructure.

Figure 2:
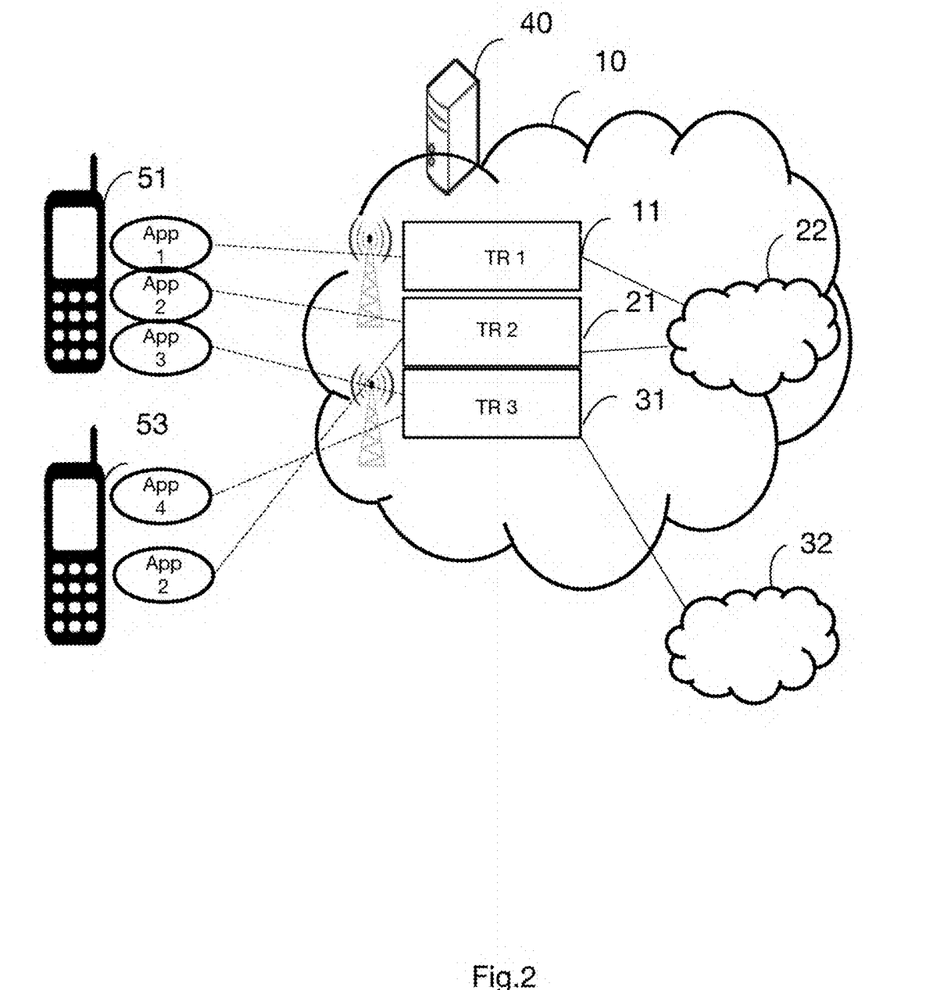
FIG. 2 presents a communications infrastructure according to one aspect of the invention.

Reference is firstly made to FIG. 2 which presents a communications infrastructure according to one aspect of the invention.

The terminal 51 supports the applications App1, App2, App3 while the terminal 53 supports the applications App2 and App4. It is considered in this example that the applications App1 and App2 are respectively audio and video applications while the applications App3 and App4 are so-called non-real-time applications, for example used for text transfer. The operator of the communications infrastructure 10 structures its infrastructure by deploying three network slices TR1, TR2, TR3 used respectively to convey audio data, video data and non-real-time data. These three slices TR1, TR2, TR3 are implemented in one and the same communications infrastructure 10 and are instantiated using software resources of a common data center, but offer capabilities and performance in terms of conveying that are suited to the data streams of the respective applications. In particular the network slice TR1 offers somewhat insignificant conveying capabilities, but with very low latency times. The network slice TR2 requires significant transport capabilities in order to circulate the video data streams as well as fairly low latency times. Furthermore, this slice has capabilities for temporary memory buffering. Finally the last slice TR3 is characterized by fairly significant capabilities and fairly significant latency times. This infrastructure can be supplemented with other network slices, not represented in the figure, as a function of the needs of the operator. In particular a default network slice could be envisaged for streams of unidentified applications or which do not require specific needs in terms of conveying.

The network slices TR1 and TR2 afford access to a services platform hosted in a communication network 22 included in the operator's communications infrastructure 10 while the slice TR3 affords access to a data network 32 not included in the infrastructure 10. This data network may for example be a network of a services provider or else a company network.

The communications infrastructure furthermore comprises a rules server 40 whose role is to provide the rules for associating network slices with the applications of the terminals.

It should be noted that the network slices, according to alternatives, can comprise functions of the access networks alone, functions of core networks alone or else functions of the access networks and also functions of the core networks. The selection method can indeed be implemented for any type of network slice considered.

Figure 3:
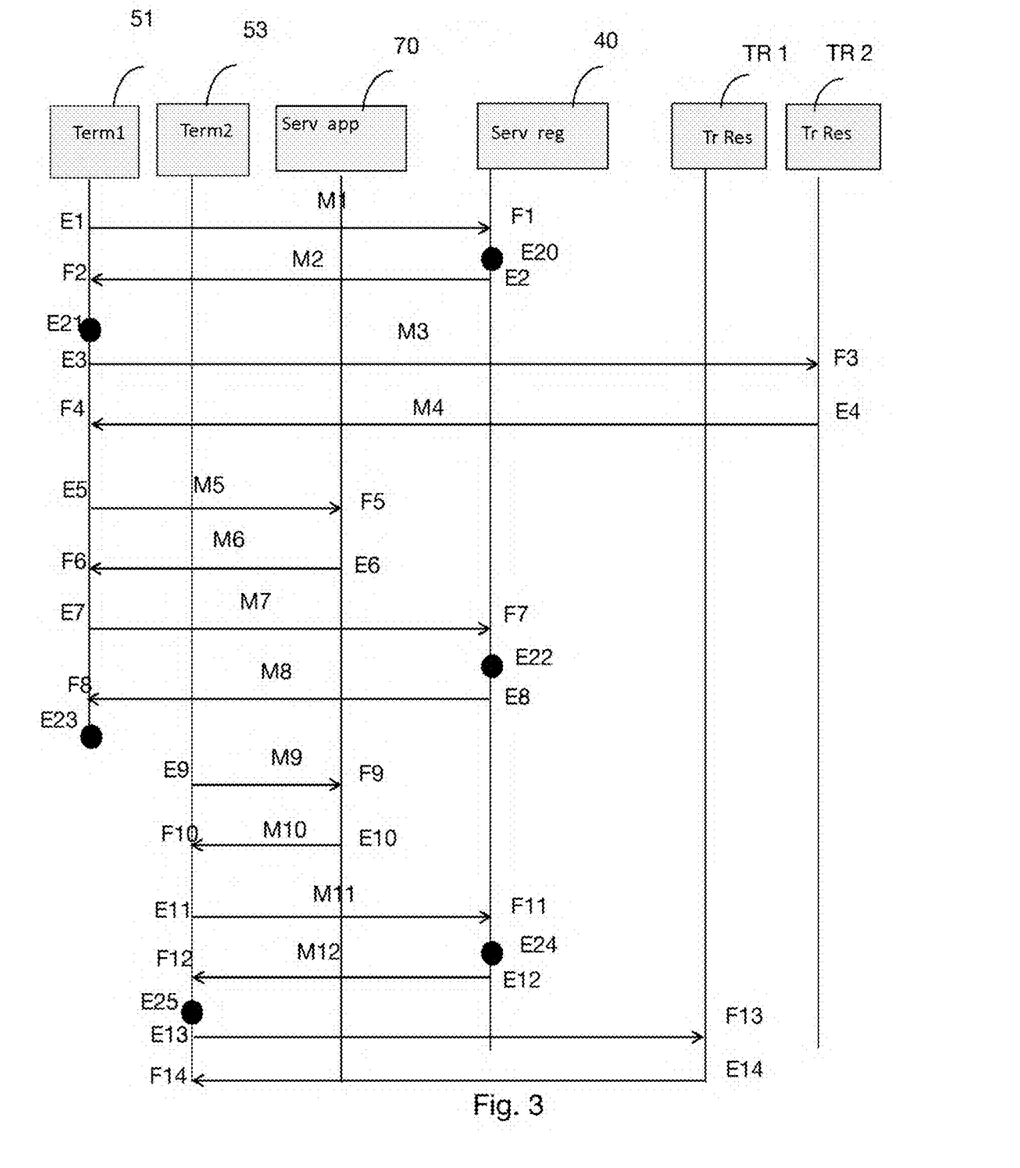
FIG. 3 presents an outline of the method for selecting a network slice, according to a first embodiment of the invention.

Presented in conjunction with FIG. 3 is an outline of the method for selecting a network slice, according to a first embodiment of the invention.

The terminal 51, in a step not represented in the figure, attaches to the network according to a known procedure specified in the prior art, in particular by the 3GPP (in English Third Generation Partnership Project) organization if the terminal 51 attaches to a mobile network or the BBF (in English "BroadBand Forum") organization if the terminal attaches to a fixed network.

During a step E1, in the course of the attachment procedure or according to an option once the terminal has attached to the communications infrastructure, the terminal 51 transmits to the rules server 40 a request message M1 comprising the identifiers of the applications already installed on the terminal 51. The message can be a specific message or else a message relating to the attachment of the terminal 51, in particular if the rules server 40 is co-located with another server invoked by the terminal 51 in order to attach to the communications infrastructure, for example an AAA (in English Authentication Authorization Accounting) server or a DHCP (in English Dynamic Host Configuration Protocol) server. The protocol used to transport the message may be for example the HTTP (in English HyperText Transfer Protocol) protocol. It should be noted that the terminal 51 can transmit all the identifiers in a single message or else, according to an alternative, dispatch one identifier per message.

According to a variant, the terminal 51 can transmit to the rules server 40 a message comprising not only the application but also the application version and, in this case, it is possible to associate an appropriate network slice corresponding not only to the application but also to the version of the application. A more recent version of an application can thus benefit from better performing network slice conveying parameters. The prospect of offering network slices which are appropriate to application versions may furthermore represent an argument for encouraging users to use more recent versions of applications and thus limit the complex management of different application versions.

Several possibilities exist for informing the terminal about the identity and/or the address of the rules server to be invoked to obtain the rules. In the case where the terminal has a SIM (in English Subscriber Identity Module) card, the information can be configured on this card. According to an alternative, the terminal can obtain the information via a protocol such as OMA-DM (in English Open Mobile Alliance—Device Management) or DHCP. An alternative consists in obtaining the information on the rules server in a message of the control plane, for example when the terminal attaches to an access network. According to another aspect, the information on the rules server can be deduced from a part of the application identifier. For example, the rules server may be reachable at the address slice.com.xample for the rules applicable to the applications whose identifiers begin with com.example.

The rules server 40, during a step F1, on receipt of the request message M1 from the terminal 51, determines during a step E20 the rules corresponding to the received identifiers of the applications. To accomplish this task, the rules server 40 can use an internal database or else one located outside the rules server. According to one option, it can invoke an administration server to obtain the rules.

During a step E2, the rules server 40 transmits the rules to the terminal 51 in a response message M2. The rules server can choose to transmit one rule per message or else to transmit all the rules in a single message.

The terminal 51 receives the response message M2 in a step F2 and, on the basis of the rules received, determines during a step E21 the network slices associated with the diverse installed applications. The terminal 51 may for example maintain a table associating each application with a network slice and refer thereto when the application is used to circulate the data streams relating to this application or, according to an option, it can add an item of information on the network slice in the software of each application so that the network slice is directly identified when launching the application. It should be noted that the determination of network slices is not linked with the use of the application and can be carried out before the application is actually activated.

During step E3, on the terminal 51, an application is activated, for example, subsequent to an action of the user of the terminal. The network slice TR2 has been determined for this application during step E21. It is considered in this example that the terminal 51 has not yet associated any applications with the network slice TR2. No application activated hitherto on the terminal 51 has in fact required selection of the slice TR2. The terminal 51 transmits a message M3 of attachment to the network slice TR2 according to the prior art, in particular described in the 3GPP specification TS 23.502 (version 0.3.0 of March 2017), using in particular the parameter S-NSSAI (in English Single-Network Slice Selection Assistance Information) identifying the network slice TR2.

If the attachment procedure is successful, in accordance with the authentication procedures in particular, an equipment of the slice TR2, for example a mobile gateway or an equipment of BNG type (in English Broadband Network Gateway) receives the message M3 during a step F3 and transmits a message M4 of acknowledgment of connection to the terminal 51 during a step E4 and, from this moment, when the terminal 51 receives the message M4 during a step F4, the data of the application can actually be conveyed on the slice TR2.

The terminal 51, during a step E5, invokes the applications server 70 to load a new application. The terminal 51 therefore transmits a message M5 of request of an application, for example by using the HTTP protocol. The server 70 can equally well be a public applications server or else a server specific to the operator in charge of the communications infrastructure within which the network slices are implemented. The application server, on receipt of the message M5 during a step F5, and if it consents to dispatch the new application requested by the terminal 51, transmits the application requested in a message M6 to the terminal 51 during a step E6. The terminal 51, on receipt of the message M6 during a step F6, then holds a new application for which no network slice is selected.

It then invokes the rules server 40 during a step E7 by transmitting a message M7 comprising the identifier of the application loaded during steps E5, F5, E6, F6. The identifier of the application may have been transmitted by the applications server 40, in particular if the application is a public one having a non-ambiguous identifier, or else the terminal has itself defined an identifier according to a technique which must be able to be understood by the rules server, typically by adding an identifier of the terminal or of the operating system of the terminal to an identifier of the application, thus rendering it unambiguous and utilizable by the rules server. The rules server 40, after it has received the request message M7 during step F7, associates a rule with the identifier received during step E22, and transmits said rule in a message M8 to the terminal 51 during step E8.

The terminal 51, once the rule has been received in the message M8 during step F8, determines during step E23 a network slice for this application on the basis of the rule received in the message M8. It is considered here that the network slice TR2 is determined for this application, activated on the terminal, and the terminal 51 does not need to attach thereto once more since it has already done so during steps E3, F3, E4, F4.

The terminal 51 can store the rule received for the application in such a way that it can avoid invoking the rules server again to obtain the rule in the case where it needs to associate a rule with the application, which might have been uninstalled or else for which it might have lost the rule obtained. This storage step makes it possible on the one hand to avoid overloading the network with rules request and reception messages and on the other hand to invoke the management entity repeatedly. Storage of the rule obtained furthermore allows faster use of the application since the step of recovering the rule from the management entity is no longer necessary. According to an alternative, this storage can make it possible to avoid the terminal having to invoke the rules server, including if a different application is involved. If the applications have normed identifiers, the terminal could deduce from a first rule obtained for a first application the rule to be applied for a second application. For example, if the first application is App1.tpsreel.com and if it has recovered a rule A, it could reuse this rule for all the applications of type %.tpsreel.com where % takes any value.

The terminal 53 also loads a new application, which can be identical or different from an application loaded by the terminal 51, during steps E9, F9 and E10, F10 in accordance with the progress of steps E5, F5, E6, F6 for the terminal 51.

The terminal 53, once the application has been received in the message M10 during step F10, invokes during step E11 the rules server 40 to obtain a rule for associating a network slice with this application by dispatching the identifier of this application in a request message M11. The rules server 40 receives the message M11 during step F11. During step E24, the server 40 associates during step E24 a rule determining a default slice since the identifier transmitted by the terminal 53 does not correspond to any specific slice or else the data of the application do not require, depending to the entity in charge of the rules, a specific processing applied to a particular network slice. The server transmits this rule during step E12 in a message M12. The terminal receives the response message M12 during a step F12. The terminal 53 selects during step E25 a default slice TR1 when it receives the rule from the server 40 and connects to the former during the activation of the application if it is not yet connected thereto. This connection is established during steps E13, F13, E14, F14 in accordance with the descriptions of steps E3, F3, E4, F4 except that the network slice differs.

Figure 4:
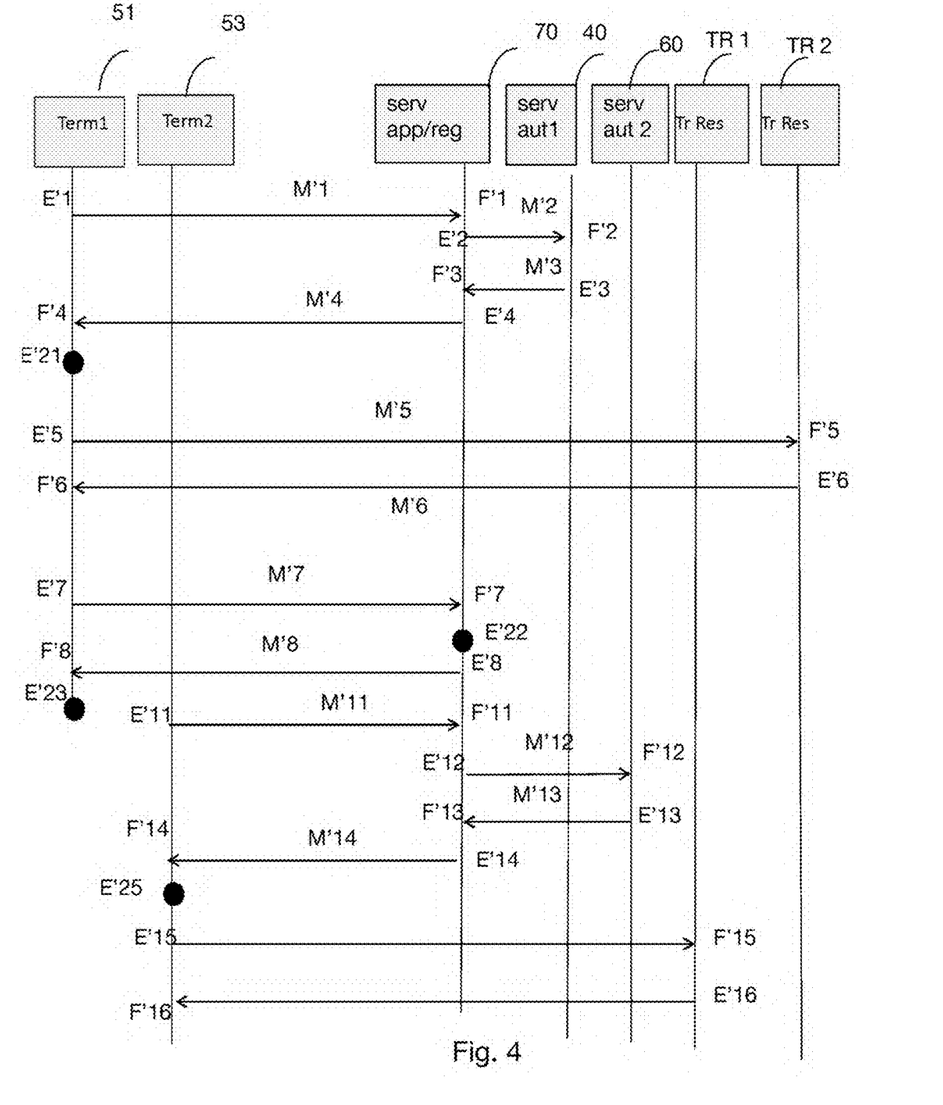
FIG. 4 presents an outline of the method for selecting a network slice according to a second embodiment of the invention.

Reference is now made to FIG. 4 which presents an outline of the method for selecting a network slice according to a second embodiment of the invention. This second embodiment is distinguished from the first by the fact that an application server itself contacts an authority server to obtain a rule relating to an application so as to thereafter transmit the application and the associated rule to the terminal which wishes to install the application.

The terminal 51 transmits a request message M'1 to the applications server 70 during step E'1 to load a new application. The applications server 70 is also a rules server but obtains the rules from an authority server which is specific to the operator of the network to which the terminal 51 is connected. The server 70, on receipt of the request message M'1 during step F'1, associates the rule with the application requested by the terminal 51 by invoking the rules server 40. If the applications server is one which is not specific to an operator, the server 70 identifies the rules server 40 to be invoked, according to one option, on the basis of the application identifier transmitted by the terminal 51, if the identifier has been established by the terminal by adding an operator prefix or suffix for example. According to another option, the server 70 identifies the server 40 on the basis of the IP (in English Internet Protocol) address used by the terminal 51 to transmit the message M'1 or else, according to another option, by configuration by associating the rules server with a parameter of the terminal 51 (IMEI (in English International Mobile Equipment Identity) code, IMSI (in English International Mobile Subscriber Identity) code). The server 70 invokes during step E'2 the authority server 40 by transmitting a message M'2 to obtain the rule or rules associated with the application requested by the terminal 51. The authority server 40, on receipt of the message M'2 during step F'2, transmits several rules with a priority parameter specific to each rule in a message M'3 to the application server 70 during a step E'3. The rules server 70 obtains the message M'3 during step F'3.

The rules server 70 transmits to the terminal 51 during step E'4 the application as well as the rules received and the associated priority parameters in a response message M'4. The terminal 51, on receipt of this message M'4 during step F'4, determines during step E'21 the network slice to be used for the application received. The terminal 51 being attached to its "mother" network, it considers the rule with the highest priority to determine the network slice corresponding to the application. The terminal 51 thereafter attaches during steps E'5, F'5, E'6, F'6 comparable to steps E3, F3, E4, F4 of FIG. 3.

The terminal 51 invokes the server 70 to load a new application during step E'7 by transmitting a message M'7. This message is identical to the message M'1 with the exception of the application, which differs. The server 70 receives the message M'7 during step F'7 and associates one or more rules with this application requested by the terminal 51. The server 70 has already associated a rule with this application during a previous invoking and has stored this rule. It therefore associates the requested application with a rule stored during step E'22, without invoking an authority server and transmits during step E'8 the application and the rule to the terminal 51 in a message M'8. The terminal 51 receives the message M'8 during step F'8 and selects the network slice TR2 on the basis of this rule and does not connect to the latter during the launching of the application since it has already attached thereto previously.

It is considered that the terminal 53 is attached to a network which is actually a visited network and that it is therefore in a roaming situation. The terminal 53 invokes the applications server 70 during step E'11 to obtain an application by transmitting a message M'11. The server receives the request message M'11 during step F'11. During step E'12, the server 70 initiates the association phase by dispatching a message M'12 to the rules server 60 corresponding to the terminal 53 or else corresponding to the operator ensuring connection of the terminal 53 to the communications infrastructure. The server 60 receives the message M'12 during step F'12 and transmits during step E'13 the rules associated with the identifier of the application requested by the terminal 53 in a message M'13 to the applications server 70. Priority parameters are also transmitted. During step F'13, the server 70 receives the message M'13 comprising the rules and the priority parameters and stores these items of information relating to the identifier of the application for which it has requested these rules. These items of information are indeed valid as they were transmitted by the authority server 60, and transmits these rules to the terminal 53 jointly with the application or in a specific message M'14 different from the message comprising the application in the course of step E'14. The applications server 70 stores the rules as a function of the rules server which transmitted them in such a way as not to transmit non-valid or non-compliant rules to a terminal invoking the same application but on the basis of a different communications infrastructure from the previous one. During step F'14, the terminal 53 receives the message M'14 comprising the rules and optionally the application. The terminal 53, in the course of step E'25, selects a rule as a function of the rules obtained and whose priority parameter corresponding to a roaming situation since the terminal 53 is situated on a visited network. The terminal 53 determines during step E'25 the network slice TR1 corresponding to the rule of lesser priority from among the rules obtained. When the application is activated, the terminal 53 then connects to the network slice TR1 during steps E'15, F'15, E'16 and F'16 which are equivalent to steps E'5, F'5, E'6 and F'6 apart from the difference that this time the terminal connects to a visited network.

According to another embodiment, the selection of a rule by a terminal can be carried out in two stages. In the previous two embodiments, a terminal obtains a rule from a rule server or from an applications server that had previously obtained a rule from an authority server. In a third embodiment, a rules server transmits to a terminal an item of information on a service class corresponding to the application identifier received. The terminal, on receipt of the information on the service class, matches up this service class with a corresponding slice identifier, either by invoking a server or by using an internal base associating the service class with a network slice. In the case where it contacts a server to associate the service class with a slice, the server may be the same as the one invoked to obtain the service class or else a different server. The information on the service class obtained corresponds to a rule relating to the network slice requested but the selection of the slice is different from the previous two embodiments. This embodiment is in particular suited to a context where an operator has structured its communication network by deploying network slices suitable for conveying data as a function of their service classes related characteristics, such as defined for example and not only in the Diffserv (in English Differentiated Services) approach.

Figure 5:
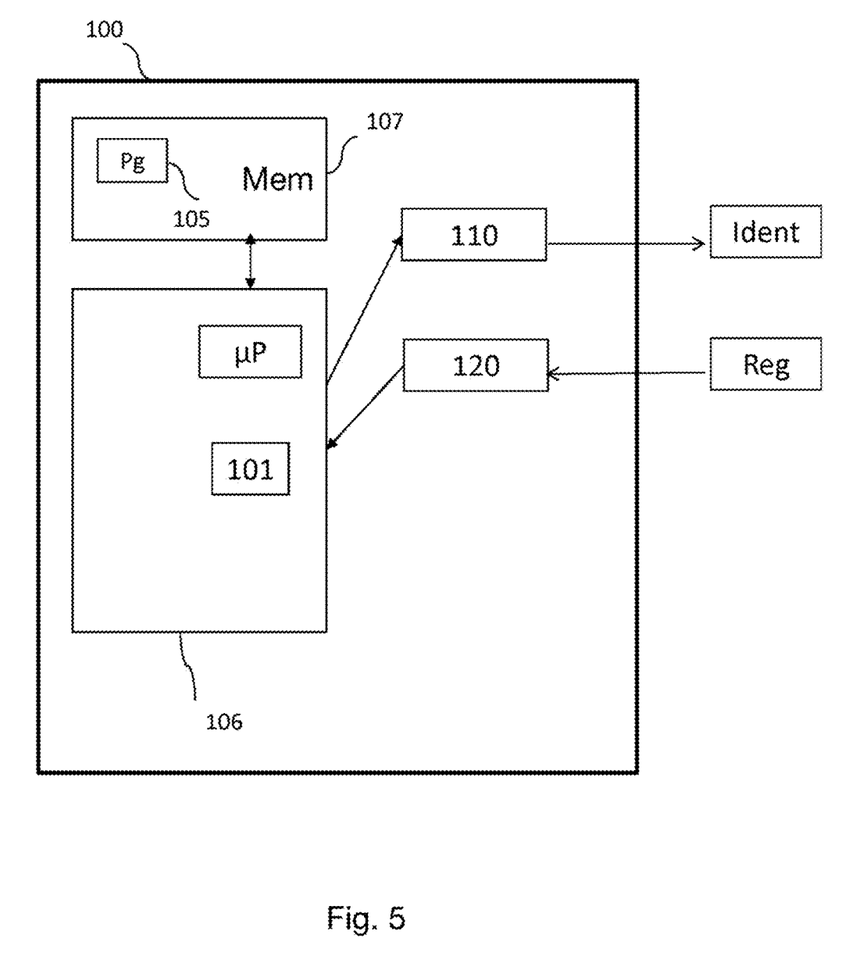
FIG. 5 presents an exemplary structure of a device for selecting a network slice, according to one aspect of the invention.

Presented in conjunction with FIG. 5 is an exemplary structure of a device for selecting a network slice, according to one aspect of the invention.

The device 100 for selecting a, so-called network slice, set of functions of a communications infrastructure implements the selection method, various embodiments of which have just been described.

Such a device 100 can be implemented in a terminal. The terminal can be a mobile terminal or a fixed terminal.

For example, the device 100 comprises a processing unit 106, equipped for example with a microprocessor µP, and driven by a computer program 105, stored in a memory 107 and implementing the selection method according to the invention. On initialization, the code instructions of the computer program 105 are for example loaded into a RAM memory, before being executed by the processor of the processing unit 106.

Such a device 100 comprises:
a sender 110 able to send, to a rules management entity, an identifier Ident of at least one application of the terminal,
a receiver 120 able to receive, from the rules management entity, at least one rule Reg relating to the network slice associated with the identifier received of the at least one application,
a determination module 101, able to determine a network slice as a function of the at least one rule Reg obtained.

Figure 6:
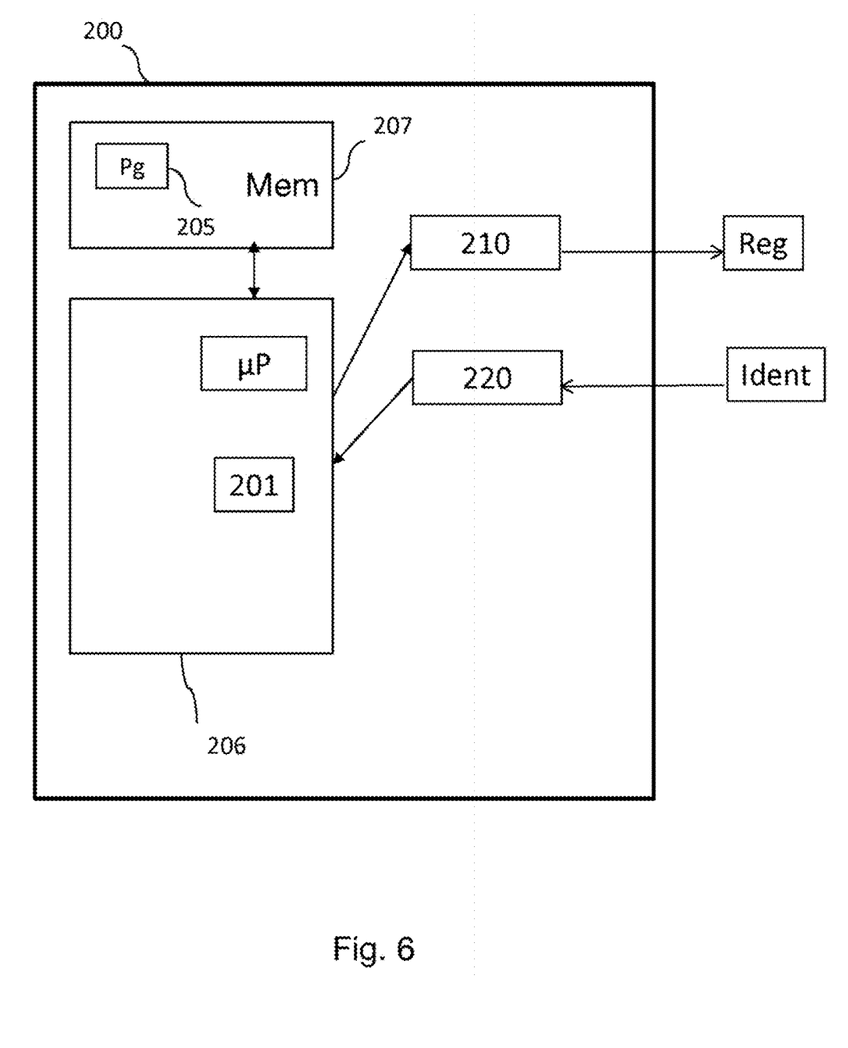
FIG. 6 presents an exemplary structure of a device for associating a rule, according to one aspect of the invention.

Presented in conjunction with FIG. 6 is an exemplary structure of a device for associating a rule, according to one aspect of the invention.

The device 200 for associating a rule relating to a, so-called network slice, function set of a communications infrastructure, implements the selection method, various embodiments of which have just been described.

Such a device 200 can be implemented in a terminal which can be a mobile terminal or a fixed terminal.

For example, the device 200 comprises a processing unit 206, equipped for example with a microprocessor µP, and driven by a computer program 205, stored in a memory 207 and implementing the selection method according to the invention. On initialization, the code instructions of the computer program 205 are for example loaded into a RAM memory, before being executed by the processor of the processing unit 206.

Such a device 200 comprises:
a receiver 220, able to receive from a terminal an identifier Ident of at least one application of a terminal, an association module 201, able to associate at least one rule Reg relating to the identifier received of the at least one application,
a sender 220, able to send to the terminal the at least one associated rule Reg.

The modules described in conjunction with FIG. 5 and FIG. 6 can be hardware modules or software modules.

The exemplary embodiments of the invention which have just been presented are only a few of the conceivable embodiments. The method for selecting a network slice and the method for associating a rule with a set of functions of a communication infrastructure make it possible to improve the quality of experience of clients. It is indeed possible to match up a network slice with the specific features of a group of applications having common characteristics and requesting identical or similar processings. Thus, an operator of a communications infrastructure can implement distinct mobile networks, identified here as network slices, within one and the same infrastructure, to carry the data streams whose characteristics are identical. This structuring of the communication infrastructure can be more or less fine according to whether the operator takes into account an application version, an application or a set of applications by taking account for example of a service class. According to another example, an operator can also associate network slices as a function of the services provider offering the application. For example, according to whether the application is provided by the provider A or B or by the operator itself, it is possible to associate the data of the application with a slice implementing more or less guarantee as regards quality of service in particular.

The invention claimed is:

1. A selection method for selecting a network slice corresponding to a set of functions of a communications infrastructure, for conveying data relating to at least one application installed on a user terminal attached to said infrastructure, implemented by the terminal and comprising:
sending, to a rules management entity, a request message comprising at least one application identifier,
receiving, from the rules management entity, a response message comprising at least one rule relating to the network slice associated with the at least one application identifier, and
selecting the network slice as a function of the at least one rule obtained.

2. The selection method, as claimed in claim 1, where the request message comprises the identifiers of the applications installed on the terminal at the moment of attachment of said terminal to said infrastructure.

3. The selection method, as claimed in claim 2, where the request message is a message relating to the attachment of the terminal to said infrastructure.

4. The selection method, as claimed in claim 1, where the at least one identifier furthermore comprises an item of information relating to an application version.

5. The selection method, as claimed in claim 1, where the at least one application identifier is determined by the terminal.

6. A method for associating at least one rule relating to a network slice, corresponding to a set of functions of a communications infrastructure, with an identifier of an application of a terminal attached to said infrastructure implemented in a rules management entity, wherein the method comprises:
receiving from the terminal a request message comprising at least one application identifier, determining at least one rule relating to the network slice associated with the at least one identifier, and sending to the terminal a response message comprising the at least one rule determined.

7. The association method, as claimed in claim 6, where a priority parameter is associated with the at least one rule and the rules management entity transmits the priority parameter to the terminal.

8. The association method, as claimed in claim 6, where the rule associated with the at least one identifier relates to a service class.

9. The association method, as claimed in claim 6, wherein the rules management entity determines a default rule and transmits the default rule to the terminal in a case where the at least one application identifier is not associated with any rule.

10. The selection method, as claimed in claim 6, where the rules management entity is implemented in an applications server.

11. A device for selecting a, so called network slice corresponding to a set of functions of a communications infrastructure, for conveying data relating to at least one application of a user terminal attached to said infrastructure, comprising:

a processor; and a non-transitory computer-readable medium comprising instructions stored thereon, which when executed by the processor configure the device to perform acts comprising:

sending, to a rules management entity, a request message comprising at least one application identifier, receiving, from the rules management entity, a response message comprising at least one rule relating to the network slice associated with the at least one identifier, and selecting a network slice as a function of the at least one rule obtained.

12. A device for associating a rule relating to a network slice corresponding to a set of functions of a communications infrastructure, with an identifier of an application of a terminal attached to said infrastructure, implemented in a rules management entity, the device comprising:

a processor; and a non-transitory computer-readable medium comprising instructions stored thereon, which when executed by the processor configure the device to perform acts comprising:

receiving from a terminal a request message comprising at least one application identifier, determining at least one rule relating to the network slice associated with the at least one identifier, and sending to the terminal a response message comprising the at least one rule determined.

13. A non-transitory computer-readable recording medium comprising a computer program stored thereon, comprising instructions for implementing a method of selecting a network slice, when the instructions are executed by a processor of a terminal, wherein the network slice corresponds to a set of functions of a communications infrastructure for conveying data relating to at least one application installed on the terminal attached to said infrastructure, wherein the instructions configure the terminal to:

send, to a rules management entity, a request message comprising at least one application identifier, receive, from the rules management entity, a response message comprising at least one rule relating to the network slice associated with the at least one application identifier, and select the network slice as a function of the at least one rule obtained.

14. A non-transitory computer-readable recording medium comprising a computer program stored thereon, comprising instructions for implementing a method of associating at least one rule relating to a network slice, corresponding to a set of functions of a communications infrastructure, with an identifier of an application of a terminal attached to said infrastructure, when the instructions are executed by a processor of a rules management entity, wherein the instructions configure the rules management entity to:

receive from the terminal a request message comprising at least one application identifier, determine at least one rule relating to the network slice associated with the at least one identifier, and send to the terminal a response message comprising the at least one rule determined.

* * * * *